United States Patent [19]

Peloquin et al.

[11] Patent Number: 5,210,571
[45] Date of Patent: May 11, 1993

[54] SYSTEM FOR SERVICING ELECTRONIC PRINTERS AND PRINTING SYSTEMS

[75] Inventors: Brad D. Peloquin, Rochester; James R. Reno, Walworth, both of N.Y.; Karen L. Dahlby, Minneapolis, Minn.

[73] Assignee: Xerox Corporation, Stamford, Conn.

[21] Appl. No.: 766,231

[22] Filed: Sep. 26, 1991

[51] Int. Cl.$^5$ .................... G03G 21/00; G06F 11/00
[52] U.S. Cl. .................... 355/203; 355/209; 355/246; 355/319; 371/16.4; 371/29.1; 380/4
[58] Field of Search .................. 355/203-209, 355/246, 319; 371/16.4, 17, 18, 23, 16.1, 29.1; 380/3, 4; 364/221.7

[56] References Cited

U.S. PATENT DOCUMENTS

| | | | |
|---|---|---|---|
| 4,316,720 | 2/1982 | Ackerman | 434/224 |
| 4,498,132 | 2/1985 | Ahlstrom et al. | 364/200 |
| 4,525,780 | 6/1985 | Bratt et al. | 364/200 |
| 4,713,753 | 12/1987 | Boebert et al. | 364/200 |
| 4,799,258 | 1/1989 | Davies | 380/21 |
| 4,937,864 | 6/1990 | Caseiras et al. | 355/204 X |
| 5,010,551 | 4/1991 | Goldsmith et al. | 355/206 X |
| 5,023,817 | 6/1991 | Au et al. | 371/29.1 X |
| 5,077,795 | 12/1991 | Rourke et al. | 355/201 X |
| 5,127,012 | 6/1992 | Hiliger | 355/205 X |

*Primary Examiner*—R. L. Moses
*Attorney, Agent, or Firm*—Frederick E. McMullen

[57] ABSTRACT

A process for enhancing detection and correction of faults when servicing copying and printing systems by allowing a service technician to run customer type jobs as test jobs, but with the job program selections that the technician is allowed to make restricted, the test job deleted when no longer needed by the technician, and billing for any prints made by the technician to a customer's account inhibited.

12 Claims, 11 Drawing Sheets

SYSTEM FOR SERVICING ELECTRONIC PRINTERS AND PRINTING SYSTEMS

The invention relates to electronic printers and printing systems, and more particularly, to a system for enhancing servicing of such printers and printing systems.

Current day electronic printers and printing systems are relatively complex machines, with the level of complexity normally increasing with increases in system size, speed, and feature selections. As the complexity and sophistication of these systems grows, the difficulty in finding, identifying, and correcting faults, problems, etc. that crop up in the system has also rises. While the service representative, referred to herein as a Tech Rep or service technician, is normally well trained and schooled in servicing the system and is provided with a variety of aides such as service manuals, test equipment, system historical data such as number of past faults, previous service call records, etc. to work with, it is ofttimes difficult to track down a particular system problem or fault in response to a customer's complaint.

In one situation for example, a customer may complain about a fault that occurs while he was running one of his print jobs. However, attempts by the Tech Rep to locate the problem, hampered many times by the inability of the customer to clearly explain the problem, are without avail despite the Tech Rep's best efforts to find the problem. While the problem may eventually be found and corrected, the time and effort required to do so may be excessive. Further, the credibility of the Tech Rep and the system manufacturer in the eyes of the customer suffers.

In situations of this type, it may be helpful if the Tech Rep could run customer print jobs that evidenced the problem. However, there is normally hesitancy in allowing Tech Rep access customer to customer jobs since this could breach the customer's file security. Further, the file(s) might be lost during the process as, for example, due to a sudden crash, or accidentally altered by the Tech Rep during the course of the servicing routine, etc.

In this context, in the prior art, U.S. Pat. No. 4,316,720 to Ackerman discloses a maintenance training system that permits a student to receive hands-on maintenance training in an electronic system without interfering with the operation of the electronic system. Further, U.S. Pat. Nos. 4,525,780 to Bratt et al and 4,498,132 to Ahlstrom et al, disclose data processing systems having protection schemes for controlling access rights to information in the system. And, U.S. Pat. Nos. 4,713,753 to Boebert et al and 4,799,258 to Davies, disclose file security systems for computers designed to prevent alteration of programs.

In contrast, the present invention provides a process for enhancing diagnosing of faults by a service technician when servicing an electronic printing system, the system including a printer for making prints, an input station providing print jobs in the form of electronic pages for printing, compression means for compressing the electronic pages, memory means for storing the compressed electronic pages, and a user interface providing an operator dialog to enable system users to input print program instructions in the form of an electronic job ticket for printing the print jobs, the user interface including an interactive screen for displaying the job ticket with print program selections for selection by the users, comprising the steps of: controlling access to the system by requiring users of the system including technicians to enter a user identification number and password; on entry of an authorized user identification number and password by a technician, enabling the technician to access the system and program a user type print job for use as a test job for diagnosing system faults; limiting access of the technician to the operator dialog by displaying a special job ticket with a restricted number of print program selections that the technician is permitted to make when programming the test job; using the operator dialog, selecting at least one the restricted number of print program selections from the special job ticket displayed whereby to program the job ticket with print program instructions for the test job; running the test job on the system in response to the print program instructions from the special job ticket; and on completion of the last run of the test job by the technician, deleting the special job ticket for the test job.

Figure 1:
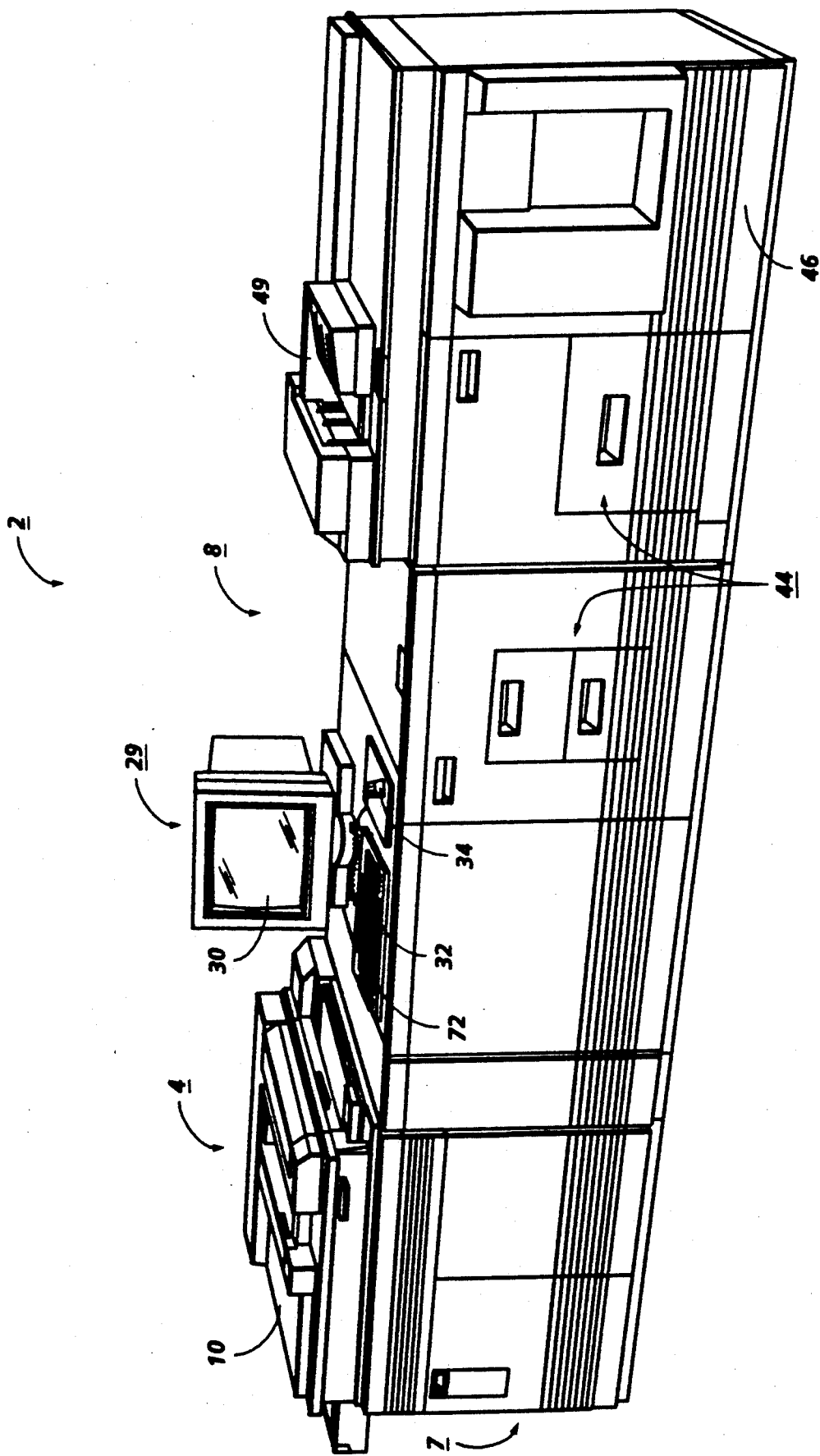
FIG. 1 is a view depicting an electronic printing system incorporating the servicing system of the present invention.
Figure 2:
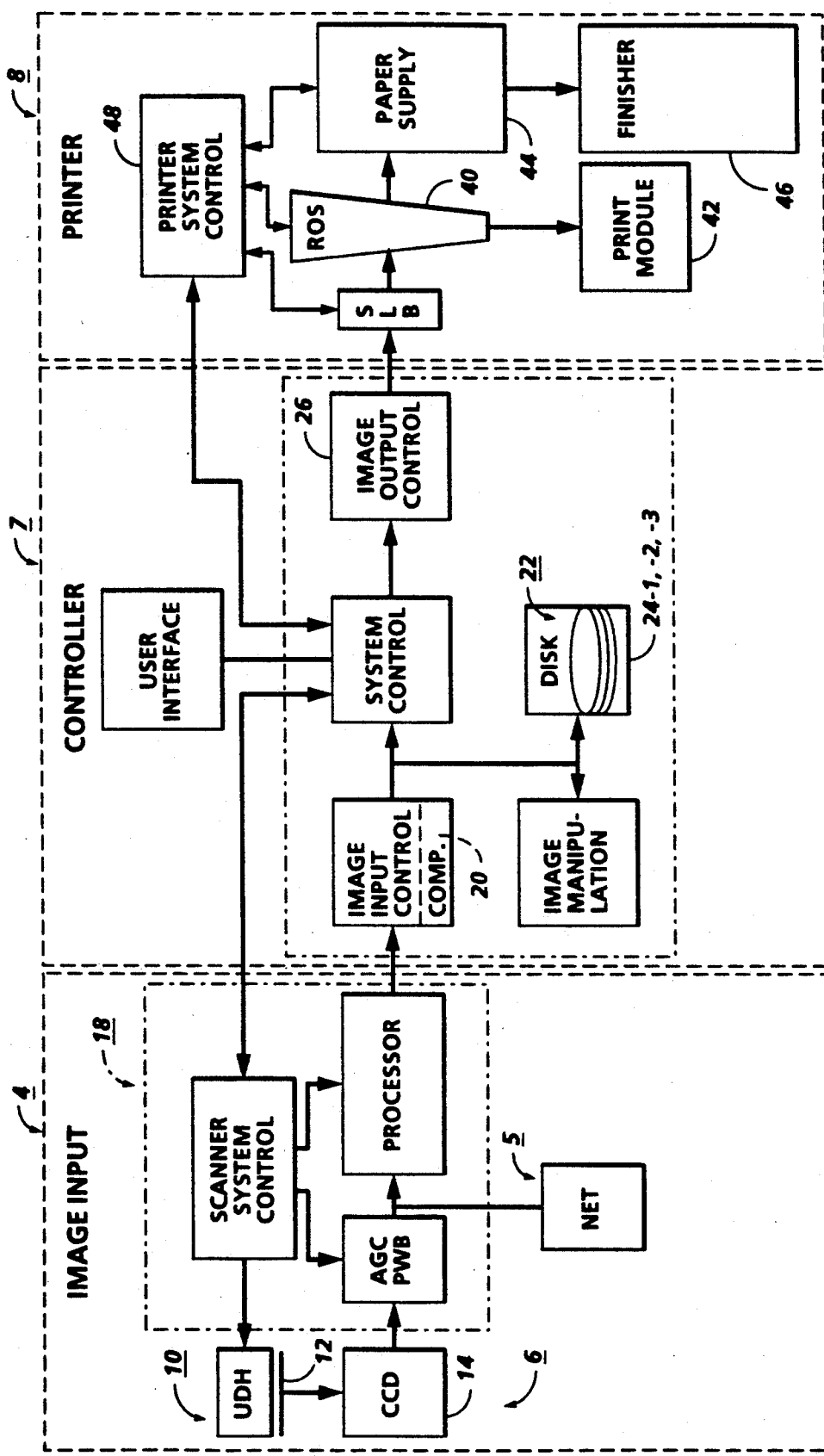
FIG. 2 is a block diagram depicting the major elements of the printing system shown in FIG. 1.

Referring to FIGS. 1 and 2, there is shown an exemplary image printing system 2 of the type adapted to use the servicing system of the present invention. Printing system 2 includes an image input section 4, controller section 7, and printer section 8. Image input section 4 has both remote and on-site image inputs, enabling system 2 to provide network, scan, and print services. Other system combinations may be envisioned such as a stand alone printing system with on-site image input (i.e., a scanner), controller, and printer; a network printing system with remote input, controller, and printer, etc.

For on-site image input, image input section 4 has a document scanner 10 for the purpose of automatically and sequentially placing and locating sets of multiple documents on a platen 12 for scanning by one or more linear light sensitive arrays 14. Array 14, which may utilize Charge-Coupled Device (CCD) technology or the like, provides image elemental signals or pixels representative of the image scanned which are input to processor 18 for processing. Alternately, documents may be located on platen 12 manually for scanning.

Processor 18 converts the analog image signals output by array 14 to digitally represented facsimile signals and processes the signals as required to enable controller section 7 to store and handle the image in the form and order required to carry out the job programmed. After processing, the image signals are output to controller section 7.

For off-site image input, image input section 4 has a network 5 with a suitable communication channel such as a telephone line enabling image data in the form of image signals or pixels from one or more remote sources to be input to processor 18 for processing. Where the Page Description Language (PDL) of the incoming imaging data is different than the PDL used by system 2, suitable conversion means (not shown) are provided. Other remote sources of image data such as streaming tape, floppy disk, etc. may be envisioned.

The image data from processor 18 is compressed by image compressor/processor 20 and placed in an image file which is stored in memory 22 pending use. Memory 22 has plural hard disks 24-1, 24-2, 24-3 for this purpose. For printing, the image data is accessed and output to image output controller 26 where the data is decompressed and readied for printing by printer section 8.

As seen in FIG. 1, a User Interface (UI) 29 consisting of a combined operator controller/CRT display provides an interactive touchscreen 30, keyboard 32, and mouse 34. UI 29 interfaces the operator with printing system 2, enabling the operator to program print jobs and other instructions, and to obtain system operating information, visual document facsimile display, programming information and icons, diagnostic information and pictorial views, etc. Items displayed on touchscreen 30 such as files and icons are actuated by either touching the displayed item on screen 30 with a finger or by using mouse 34 to point a cursor 36 (seen in FIG. 3) to the item selected and keying the mouse.

Printer section 8 has a laser type printer with a Raster Output Scanner (ROS) 40, Print Module 42, Paper Supply 44, Finisher 46, and Printer System Control 48. ROS 40 uses plural laser beams modulated in accordance with the content of an image signal input by acousto-optic modulator to create latent electrostatic images on a photoreceptor. The latent electrostatic images are developed and transferred and fixed to a print media delivered by Paper Supply 44. The finished prints are delivered to either top tray 49 or to finisher 46 which provides certain finishing selections such as a stitching, stapling, etc. Printer system control 48 automatically and precisely controls all the printer functions and operations in accordance with job program instructions received from controller section 7.

While a specific printing system is shown and described, the present invention may be used with other types of printing systems. For example, printer section 8 may instead use a different printer type such as ink jet, ionographic, thermal, photographic, etc., and furthermore may be incorporated in electronic display systems, such as CRTs, LCDs, LEDs, etc., or else other image scanning/processing/recording systems, or else other signal transmitting/receiving, recording systems, etc. as well.

A more complete description of printing system 2 may be found in copending U.S. patent application Ser. No. 07/748,717 to Lawrence E. Peck, and entitled "System for Training Technicians for Servicing Electronic Printers and Printing Systems", filed on Aug. 22, 1991, the disclosure of which is herein incorporated by reference.

Figure 3:
FIG. 3 is a view depicting an exemplary job programming ticket and job scorecard displayed on the User Interface (UI) touchscreen of the printing system shown in FIG. 1.

Referring to FIG. 3, jobs are programmed in a Job Program mode in which there is displayed on touchscreen 30 a Job Ticket 50 and a Job Scorecard 52 for the job being programmed. Job Ticket 50 displays various print program selections available for programming the test job, while Job Scorecard 52 displays the basic instructions to the system for printing the job. Various Job Ticket types are provided, with access by means of Job Types and Tickets icon 54.

Figure 4:
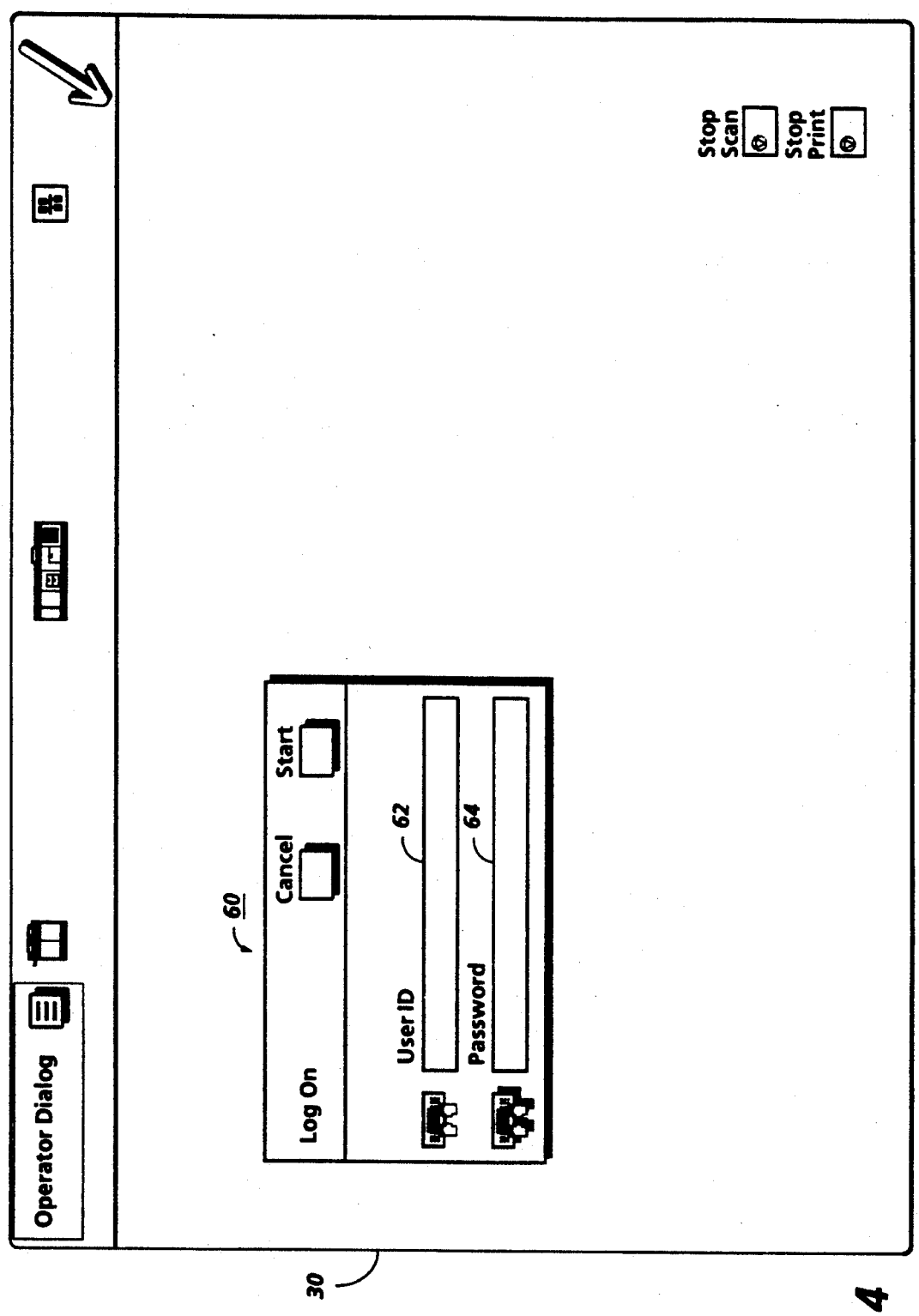
FIG. 4 is a view of the UI touchscreen in which the Log-On Sheet for entry into Diagnostics mode is shown.
Figure 5:
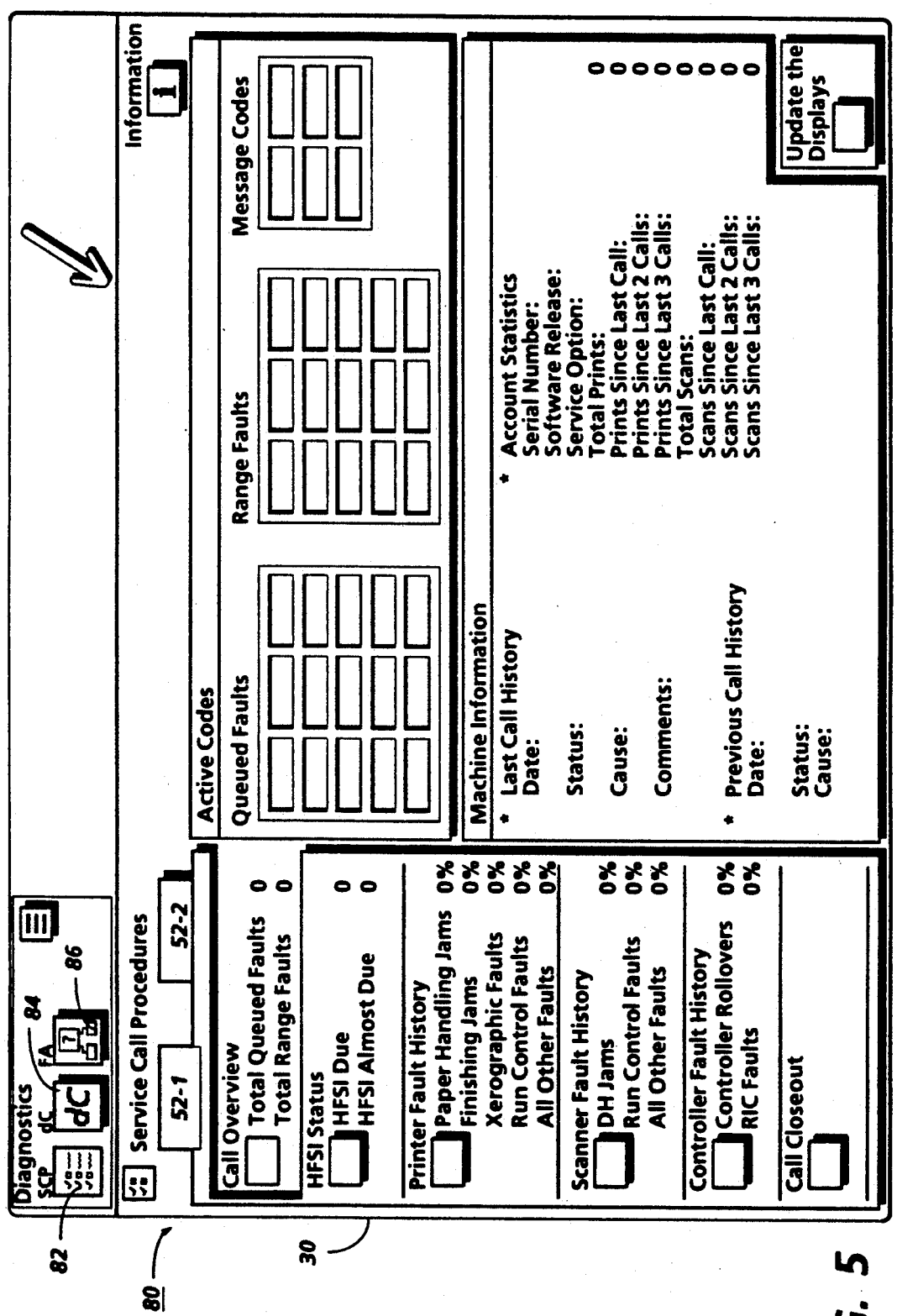
FIG. 5 is a view of the UI touchscreen showing the Service Call Procedure sheet obtained on entry into the Diagnostic mode.
Figure 6:
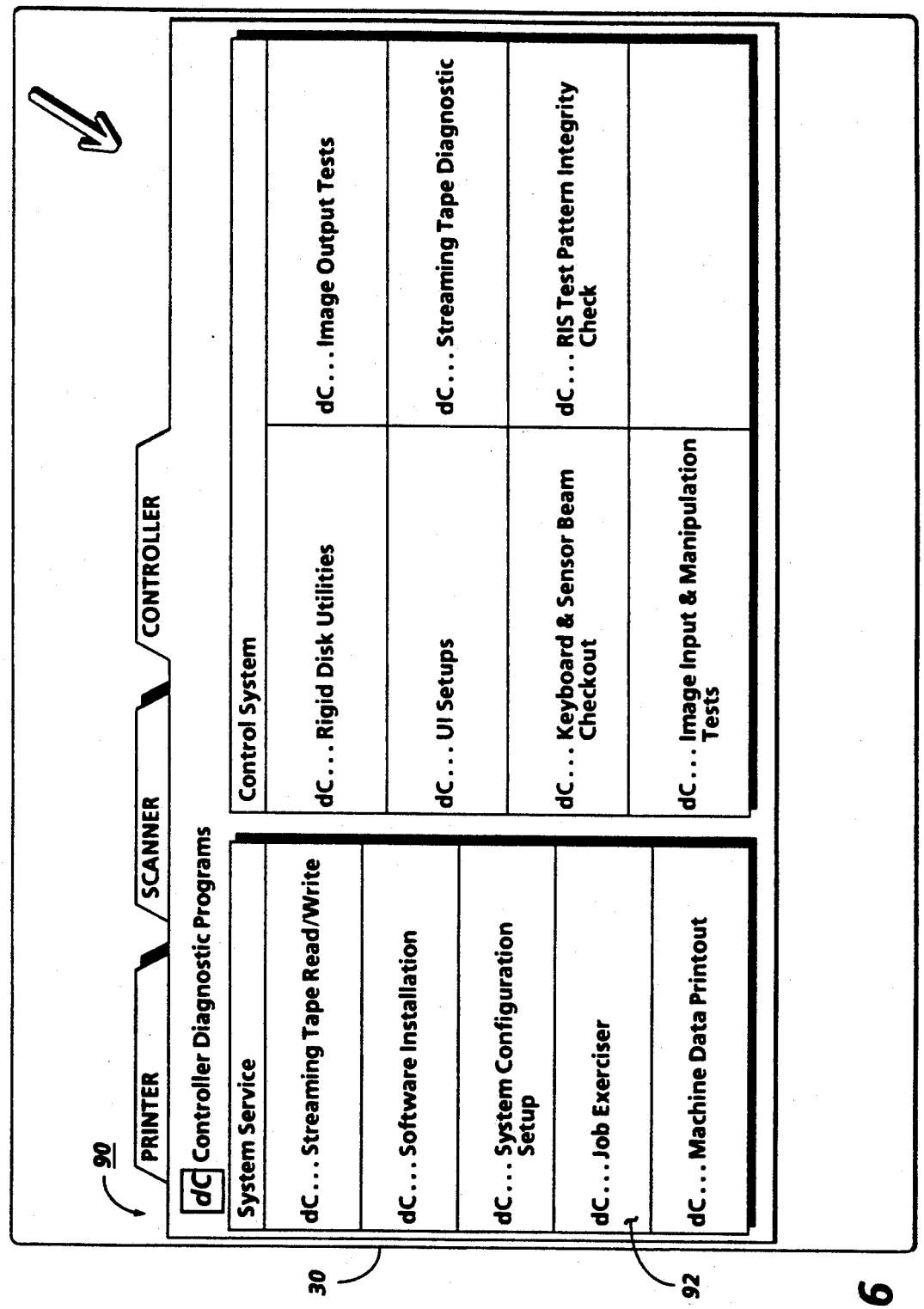
FIG. 6 is a view of the UI touchscreen depicting the various Controller Diagnostic Programs including job exerciser available for selection by the Tech Rep.

Referring to FIG. 4, the business location for the printing system 2, referred to herein as the site, is normally secured to prevent unauthorized persons from using or tampering with the system. Typically, site security is achieved by giving each user a user Identification Number (User ID) 62 and Password 64. As a result, a user, in order to gain access to printing system 2, must authenticate himself by entering his User Identification Number (User ID) and Password.

Since Tech Reps are also users who require access to the system in order to service and repair the system, Tech Reps are also assigned a Tech Rep ID number 62 and Tech Rep Password 64. The Tech Rep ID number 62 may be a number assigned when printing system 2 is manufactured or when system 2 is installed while the Tech Rep Password 64 may be assigned by the service organization to which the Tech Rep belongs. This protects both the service organization and the site by limiting access to only Tech Reps who have the correct password. The Tech Rep password can be changed at any time by the service organization.

Normally, the Tech Rep is barred from accessing or using customer files stored in system 2. This is done to prevent a Tech Rep from altering or erasing customer files, from reading privileged or confidential communications, etc. In the present invention, the Tech Rep is permitted to program and run customer type jobs for the limited purpose of servicing the system. The intent is to allow the Tech Rep to program and execute a job while in the Diagnostic Mode without having access to the full operator dialog provided by UI 29. As will appear, the Limited Job Run options or selections provided are a sub-set of the operator dialog job options provided by UI 29. This protects customer files against loss, alteration, etc. by the Tech Rep during the course of servicing the system since the Tech Rep is not able to access, change or alter the customer's files. Additional program choices, which are not available to the ordinary user are also made available to the Tech Rep as will appear.

Referring now particularly to FIGS. 4–10A and 10B, to service system 2, a Diagnostic Mode ("Diagnostics") is entered. This mode provides access to various diagnostic routines stored in the system and available to the Tech Rep for use in identifying and correcting system faults. Alternately or in addition, diagnostic routines may be loaded in from exterior sources as by floppy disk, streaming tape, etc. To enter the Diagnostic Mode and access the service dialog, a system auxiliary menu icon 70 (seen in FIG. 3) is provided together with a "Diagnostic" selection button 72 on keyboard 32 (seen in FIG. 1).

On actuation of auxiliary menu icon 70 either by touching icon 70 or by pointing cursor 36 to icon 70 and keying mouse 34, the Log On sheet 60 is displayed on screen 30 with "User ID" and "Password" windows 62, 64. Using Log On sheet 60 and entering the correct user ID number 62 and Password 64, the Tech Rep logs onto the system. With logging on, a special default account is set up against which any jobs run by the Tech Rep during servicing are logged. This enables statistics such as number of prints, finishing selections, etc. to be collected yet does not bill any Tech Rep jobs to a customer's account.

To access the special or "Limited Job Run" ticket that enables the Tech Rep to simulate and run customer type jobs as test print jobs during servicing of the system 2, "Diagnostic" button 72 on keyboard 32 is depressed to display "Service Call Procedures" (SCP) frame 80 on screen 30. Frame 80 has SCP, "Controller Diagnostic Programs" (dC), and "Fault Analysis" (FA) buttons 82, 84, and 86 respectively for selection. Actuating dC button 84 displays a "Controller Diagnostics Programs" frame 90 listing the various diagnostic programs available for selection. These include a "Job Exerciser" 92 diagnostic program. Selecting "Job Exerciser" 92 displays a "Limited Job Run" job ticket 50-1, 50-2, or 50-3 that provides the Tech Rep with limited print program selections for programming jobs in either a "Scan & Print" mode, or a "Print" mode, or "Compression Ratio Test" mode. "Scan & Print", "Print", and "Compression Ratio Test" modes are selected by means of "Scan & Print" "Print", and "Compression Ratio Test" buttons 100, 102, 103 respectively. "Scan & Print" mode, which has the job ticket 50-1 shown in FIG. 7, and "Compression Ratio Test" mode utilize both scanner and printer sections 4 and 8 respectively while "Print" mode, which has the job ticket 50-2 shown in FIG. 8, utilizes printer section 8 only as will appear.

Compression ratio test enables the Tech Rep to determine if compressor/processor 20 is satisfactorily compressing the image data for storage on disks 24-1, 24-2, 24-3 of memory 22. Where compressor/processor 20 is not compressing the data at the designed ratio, the amount of data that can be stored on disks 24-1, 24-2, 24-3 is reduced which, in turn, reduces the operating efficiency of the system.

Figure 7:
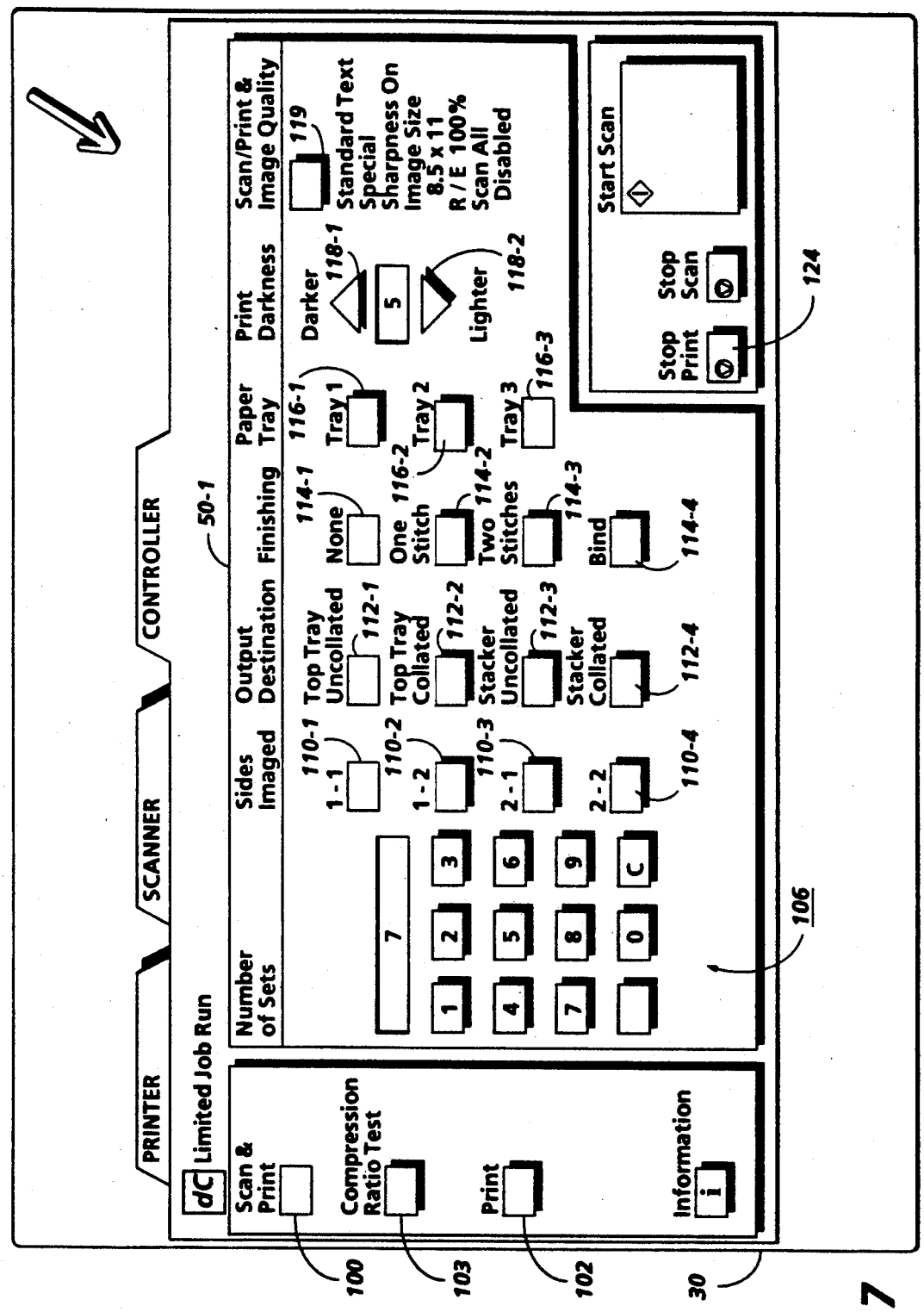
FIG. 7 is a view of the UI touchscreen showing the program selections available in the job exerciser program on entry into the Scan & Print mode.
Figure 10A:
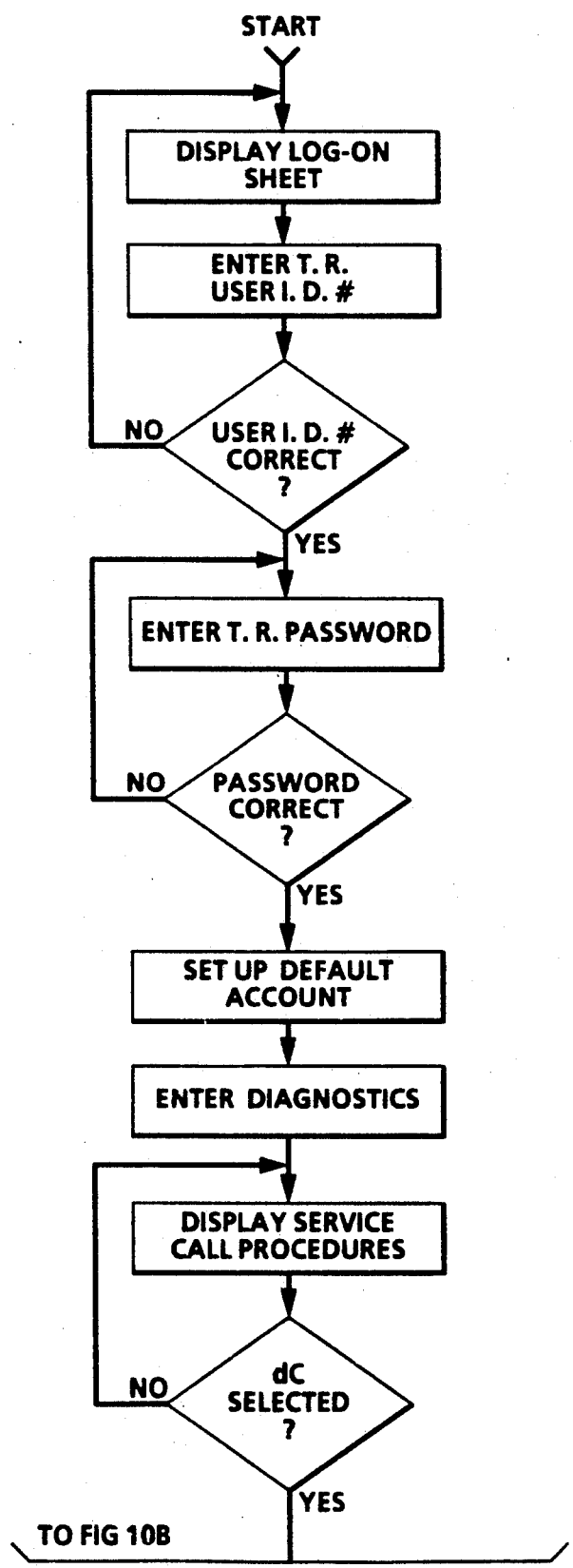
FIGS. 10A and 10B are flow charts depicting the servicing process of the present invention.
Figure 10B:
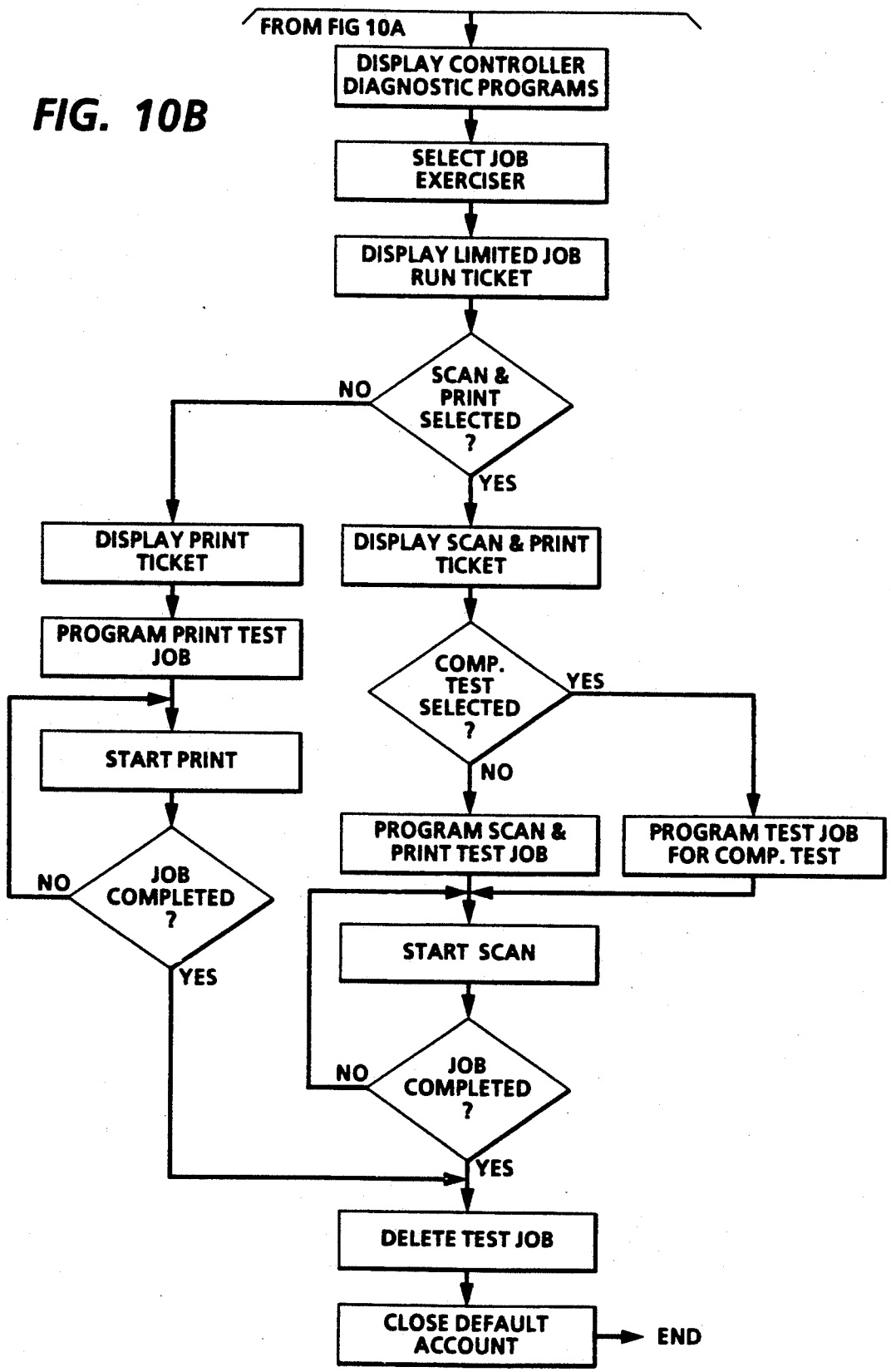

Referring particularly to FIGS. 7 and 10A and 10B, actuating "Scan & Print" button 100 displays a "Scan & Print" job ticket 50-1 having a series of icons representing the limited number of print program selections available to the Tech Rep in this mode. These include a key pad icon 106 that enables the Tech Rep to program the number of sets to be printed. As will be understood, the number of pages in a set is determined by the number of documents in document handler 10. Additionally, there is provided "Sides Imaged" buttons 110-1, 110-2, 110-3, 110-4 for simplex-to-simplex ("1-1"), simplex-to-duplex ("1-2"), duplex-to-simplex ("2-1"), and duplex-to-duplex ("2-2") printing selection; "Output Destination" buttons 112-1, 112-2, 112-3, 112-4 for "Top Tray Uncollated", "Top Tray Collated", "Stacker Uncollated", and "Stacker Collated" selections respectively; "Finishing" buttons 114-1, 114-2, 114-3, 114-4 for "None", "One Stitch", "Two Stitches", and "Bind" finishing selections; "Paper Tray" selection buttons 116-1, 116-2, 116-3 for selecting "Tray 1", "Tray 2", or "Tray 3" as the paper tray from which the print stock will be supplied; "Print Darkness" buttons 118-1 and 118-2 respectively for setting print darkness or lightness levels, and "Scan/Print and Image Quality" button 119 for image quality selection.

Figure 8:
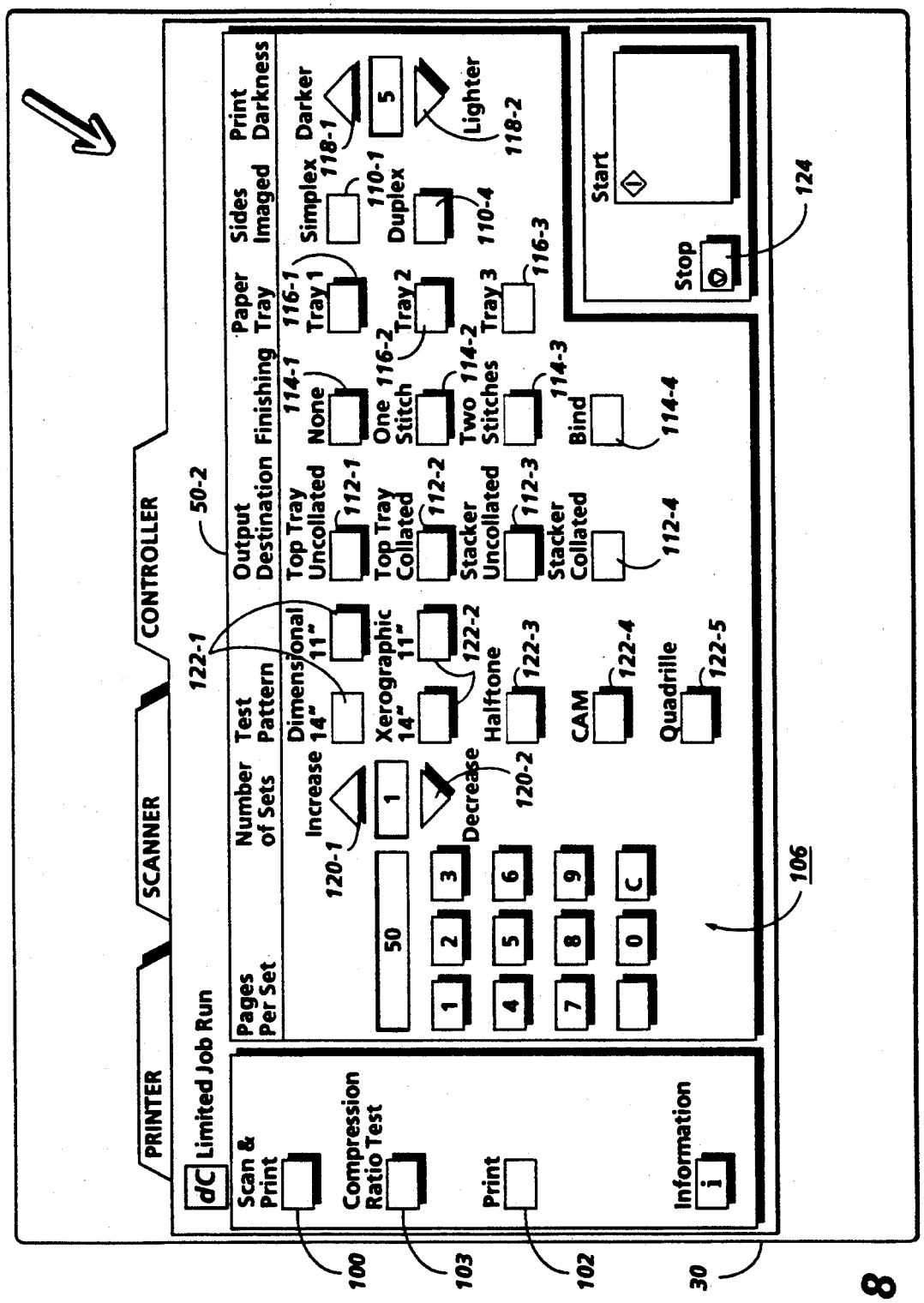
FIG. 8 is a view of the UI touchscreen showing the program selections available in the job exerciser program on entry into the Print mode.

Referring particularly to FIGS. 8 and 10A and 10B, actuating "Print" button 102 displays "Print" job ticket 52-2 with the program selections available to the Tech Rep in the "Print" mode. These include key pad 106 for selecting the number of pages per set; "Sides Imaged" buttons 110-1 ("Simplex"), 110-4 ("Duplex"); Output Destination buttons 112-1, 112-2, 112-3, 112-4; "Paper Tray" selection buttons 116-1, 116-2, 116-3; and "Print Darkness" buttons 118-1, 118-2 as described above. "Number of Sets" buttons 120-1 and 120-2 enable the number of sets programmed for printing to be increased or decreased respectively.

Additionally, "Test Pattern" selection buttons 122-1, 122-2, 122-3, 122-4, 122-5 permit the Tech Rep select registration, solid area, halftone, text, and halftone picture test patterns stored in the system memory 22. "Test Pattern" selections are the type of selection that are not ordinarily available to the normal user or operator of system 2 but instead are for the use of the Tech Rep only.

Figure 9:
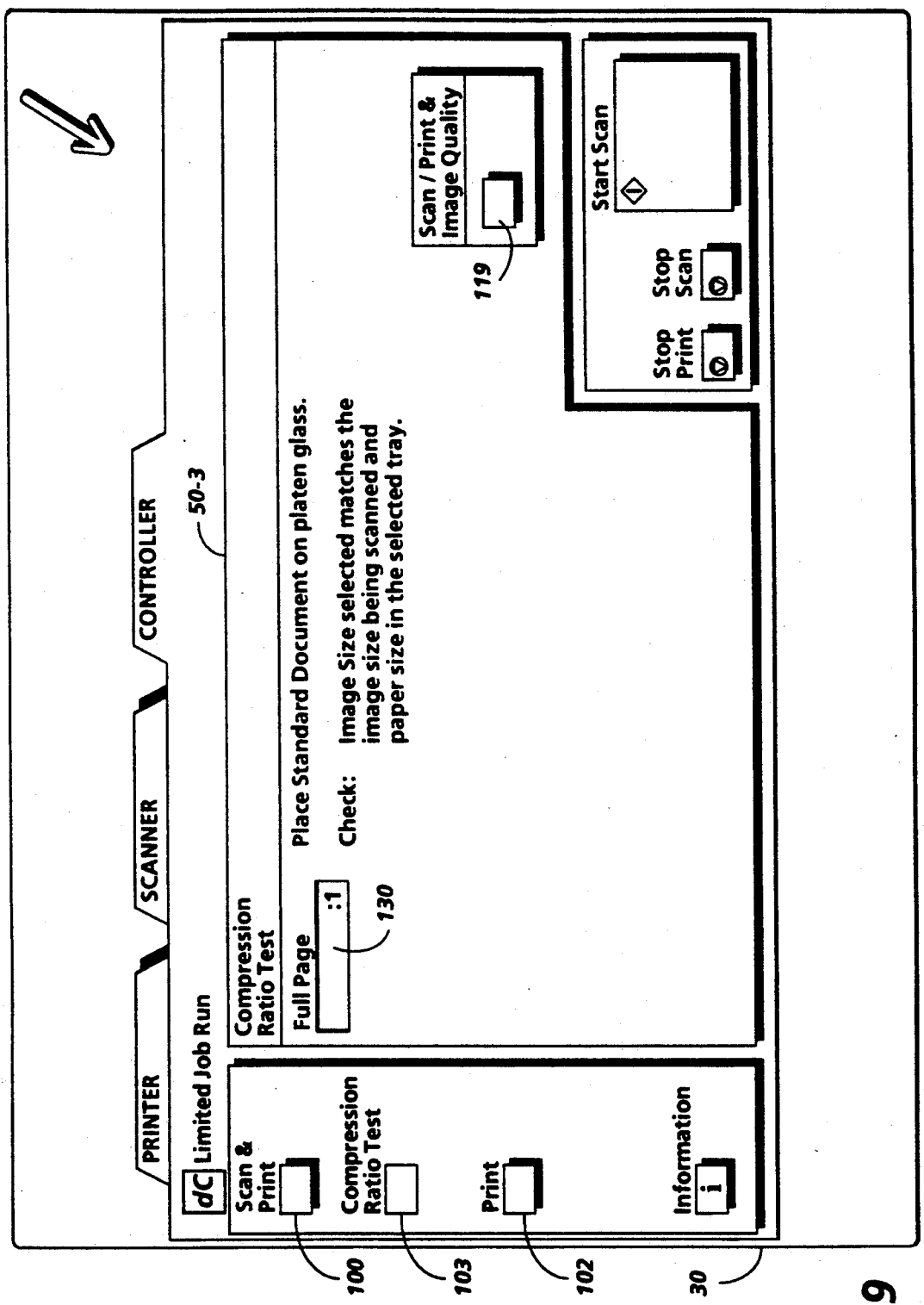
FIG. 9 is a view of the UI touchscreen showing the compression ratio test display obtained when the compression ratio test selection is chosen.

Referring to FIGS. 9, 10A and 10B, actuating "Compression Ratio Test" button 103 displays "Compression Ratio Test" job ticket 50-3 that enables the Tech Rep to identify the current operating compression ratio of compressor/processor 20. For this, a standardized document is placed on platen 12, the number of prints desired programmed using keyboard 106 (seen in FIG. 7), and Start/Scan selected. It is necessary for this test that the image size selected matches the document size and the size of the print media in paper supply 44. Scanner 10 scans the document on platen 12 while printer section 8 prints the number of prints programmed. The compression ratio, which is a ratio of input bits to output bits to and from compressor/processor 20, is displayed in window 130. Using this information, the Tech Rep can compare the ratio shown in window 130 with the ratio that should be obtained when processing the standarized document.

It is understood that the print program selections described above are exemplary only and that different and/or additional selections may be provided. Further, that various test pattern types other than those described may be envisioned as well as various types of documents for testing the compression ratio.

When the Tech Rep is finished running the test job, stop button 124 is depressed. Actuation of stop button 124 purges the copy of the test job from the system. Since any jobs run by the Tech Rep are charged to the special default account, prints made by the Tech Rep during the course of servicing the system are not billed by the system. At the end of servicing, the special default account is closed.

While the invention has been described with reference to the structure disclosed, it is not confined to the details set forth, but is intended to cover such modifications or changes as may come within the scope of the following claims.

We claim:

1. A process for enhancing diagnosing of faults by a service technician when servicing an electronic printing system, said system including a printer for making prints, an input station providing print jobs in the form of electronic pages for printing, compression means for compressing said electronic pages, memory means for storing said compressed electronic pages, and a user interface providing an operator dialog to enable system users to input print program instructions in the form of an electronic job ticket for printing said print jobs, said user interface including an interactive screen for displaying said job ticket with print program selections for selection by said users, comprising the steps of:
  a) controlling access to said system by requiring users of said system including technicians to enter a user identification number and password;
  b) on entry of an authorized user identification and password by a technician, enabling said technician to access said system and program a user type print job for use as a test job for diagnosing system faults;
  c) limiting access of said technician to said operator dialog by displaying a special job ticket with a restricted number of print program selections that said technician is permitted to make when programming said test job;
  d) using said operator dialog, selecting at least one said restricted number of print program selections from the special job ticket displayed in step c whereby to program said job ticket with print program instructions for said test job;
  e) running said test job on said system in response to said print program instructions from said special job ticket; and
  f) on completion of the last run of said test job by said technician, deleting said special job ticket for said test job.

2. The process according to claim 1 including the step of:
  setting up a special account for test jobs run by said technician; and
  billing said test job against said special account whereby to avoid billing of said user for prints made by said technician when running said test job.

3. The process according to claim 1 including the step of:
  enabling selection of the number of prints of said test job to be printed on said special job ticket.

4. The process according to claim 1 including the step of:
  enabling simplex and duplex processing selections for said test job on said special job ticket.

5. The process according to claim 1 including the step of:
  enabling selection of finishing for the prints produced by said test job on said special job ticket.

6. The process according to claim 1 including the step of:
  enabling selection of image contrast for the prints produced by said test job on said special job ticket.

7. The process according to claim 1 including the step of:
  enabling selection of the paper stock type on which the prints for said test job are printed on said special job ticket.

8. The process according to claim 1 including the step of:
  providing at least one additional print program selection on said special job ticket that is not available to said user through said operator dialog for selection by said technician for said test job.

9. The process according to claim 8 including the step of:
  enabling said technician to access at least one test pattern in said memory means for printing by said test job.

10. The process according to claim 8 including the step of:
  displaying a selection for said test job for determining compression ratio of said compression means on said special job ticket; and
  on selecting said compression ratio determining selection, printing a test job that identifies the compression ratio of said compression means.

11. A process for enhancing diagnosing of faults by a service technician when servicing an electronic printing system, said system including a printer for making prints, an input station providing print jobs in the form of electronic pages for printing, memory means for storing said electronic pages, and a user interface for establishing an operator dialog between system users and the system to enable a user to input print program instructions for printing said print jobs on said system, said user interface including an interactive screen for displaying program selections for use in inputting print program instructions for print jobs, comprising the steps of:
  a) enabling said technician to enter said system for servicing said system and correcting system faults;
  b) while in said system, allowing said technician to run customer type print jobs in order to provide test print jobs for use in diagnosing system faults; and
  c) limiting the print program selections allowed to said technician in said operator dialog when inputting print program instructions for said test print jobs to program selections required for diagnosing system faults.

12. The process according to claim 11 including the step of:
  enabling said technician to select electronic pages in the form of test screens in said memory means for said test print jobs.

* * * * *